Sept. 14, 1926.  
J. T. JANETTE  
ROTOR FOR ELECTRIC MOTORS  
Filed Dec. 11, 1922

1,599,415

Witness:  
W. K. Olson

Inventor:  
John T. Janette  
By Glenn S. Noble Atty.

Patented Sept. 14, 1926.

1,599,415

UNITED STATES PATENT OFFICE.

JOHN T. JANETTE, OF CHICAGO, ILLINOIS.

ROTOR FOR ELECTRIC MOTORS.

Application filed December 11, 1922. Serial No. 606,161.

This invention relates to rotors or core members for alternating current motors and is particularly directed to the fastening of the laminations or rotating element to their supporting shaft and to the method of construction and assembling the same.

The principal object of the present invention is to provide means for securing the laminations of a rotor to the shaft and to provide for the the simultaneous spiral mounting of the laminations. Another object is to provide an improved method of constructing or assembling the parts of a rotor and other objects appear more fully from the following description.

In the accompanying drawings illustrating this invention:—

The necessity or desirability of the spiral or progressive arrangement of the laminations of a rotor is well understood but it has heretofore been difficult to construct such rotors in this manner and have the spirals of the laminations or progression thereof on the shaft arranged in a uniform or correct manner. In accordance with the common practice, the laminations are first assembled and secured together and then forced onto or secured to the shaft. In order to avoid the difficulties and imperfections of such previous arrangements, I construct my improved rotor by having a spiral locking between the shaft and the respective laminations so that the laminations will be automatically arranged in the proper relations to each other and to the shaft as they are pressed or slipped on to the shaft. This fastening device is shown and claimed in my Patent No. 1,467,938, issued Sept. 11, 1923. While such spiral locking or keying may be provided in various ways, an exceedingly simple method or arrangement is shown in these drawings.

Figure 1:
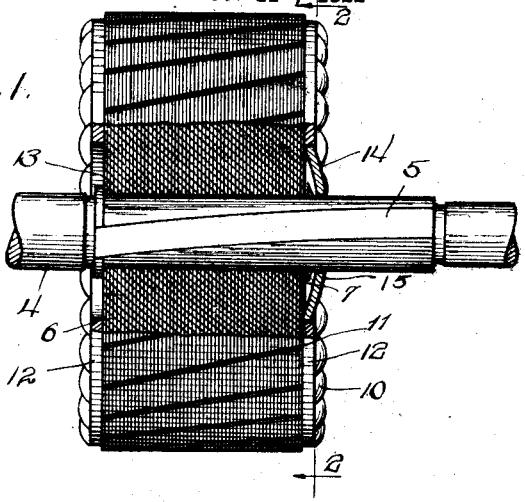
Figure 1 is a side view of the rotor with parts broken away to show the innner construction.
Figure 2:
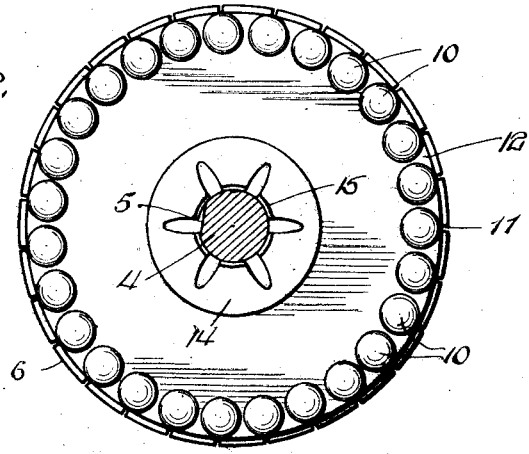
Figure 2 is taken on the line 2—2 of Figure 1.
Figure 3:
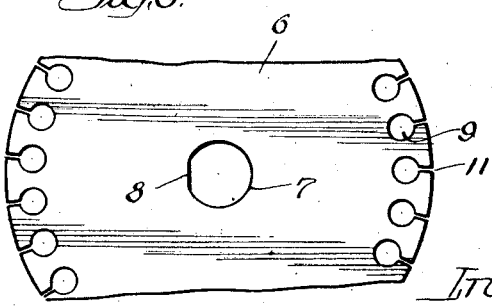
Figure 3 is a detail showing one of the laminations.

A shaft 4 is cut away or formed with a longitudinal flat portion 5 which is arranged spirally or progressively as shown particularly in Figure 1. In other words, starting from a given point this flat or key-like portion is advanced around the circumference of a shaft in accordance with the desired spirally or lead of the laminations in order that peripheral slots will have the desired position with respect to the shaft. The laminations 6 are preferably punched or formed with center holes 7 which fit the shaft 4 and have flat places 8 which engage with the flattened portion 5 of the shaft. These laminations have the usual holes 9 adjacent to the outer edges for receiving the bolts or rivets 10 and also have slots 11 extending out from such holes. The end rings 12 and laminations 6 are held together by these rivets in the usual manner. These rivets are also commonly known as rotor bars or by other similar names.

The shaft 4 is provided with a shoulder or collar 13 and when the device is to be assembled, the laminations are pressed onto the opposite end of the shaft and against this shoulder, the respective laminations being automatically arranged in proper position as they are brought into place on the shaft, this being due to the spiral arrangement of the flat portion 5 which coacts with the flat portion 8 of the laminations in order to properly position them on the shaft. The end rings 12 are then placed in position and the parts connected by means of rivets 10. The rotor may be held against longitudinal movement by any suitable means, but I prefer to use a washer or locking device 14 which has a plurality of radial tongues 15 which are adapted to engage with the shaft 4 to hold the rotor against the shoulder 13. This washer is preferably made of steel and hardened so that it is somewhat harder than the shaft, whereby the cutting edges of the tongues will bite into the shaft when the washer is pressed into position as shown in Figure 1. It will be noted that in some cases the rotor may be formed on a mandrel having a spiral flat portion or key-way which coacts with the flat portions or projections of the laminations and after the parts have been fastened together the complete rotor may be placed in position on the shaft.

From this description it will be seen that this spiral key-like connection not only provides means for driving the rotor or preventing its turning on the shaft but also provides means for securely aligning the rotor laminations in the desired manner. It will be noted that the spiral connection between the rotor and shaft may be made in various ways in order to accomplish the desired results and therefore I do not wish to be limited to the exact construction or arrangement herein shown and described, except as specified in the following claims, in which I claim:—

1. A rotor having a spirally arranged flattened portion on the shaft and having laminations provided with holes having flattened portions to fit the shaft, said laminations also having core slots arranged at angles to the axis of the core member.

2. In a device of the character set forth, the combination with a shaft having a spirally flattened driving portion, of a plurality of laminations, each lamination having a flattened portion adapted to register with said spiral driving portion and having uniformly arranged radial slots, the arrangement being such that the slots of the respective laminations will be automatically brought into spiral relation with the shaft.

3. The combination with a round shaft having a spirally arranged flat portion of a rotor member composed of a plurality of laminations mounted on the shaft, each of said laminations having a flat place for engagement with the flat place on the shaft.

4. The combination with a round shaft having a longitudinally arranged spiral flat portion, of a member comprising a plurality of plates mounted on the shaft, each of said plates having a flat portion engaging with the flat portion on the shaft whereby the member will be driven by the shaft and whereby the several laminations will be arranged spirally with respect to the shaft.

5. A rotor construction comprising a shaft having a rotor receiving portion which in cross section is in the form of a segment of a circle, the straight portions of the segments being arranged so that they provide a spiral flat surface along the shaft, and a rotor engaging with the shaft, said rotor comprising a plurality of laminations each of which has a hole in the form of a segment of a circle and adapted to fit closely over the shaft.

JOHN T. JANETTE.